United States Patent [19]

Matsushita

[11] 4,110,300

[45] Aug. 29, 1978

[54] SELF-EXTINGUISHING SILICONE RUBBER COMPOSITIONS

[75] Inventor: Takao Matsushita, Ichihara, Japan

[73] Assignee: Toray Silicone Company, Ltd., Tokyo, Japan

[21] Appl. No.: 849,114

[22] Filed: Nov. 4, 1977

[30] Foreign Application Priority Data

| Nov. 12, 1976 | [JP] | Japan | 51-135410 |
| Nov. 12, 1976 | [JP] | Japan | 51-135411 |
| Nov. 12, 1976 | [JP] | Japan | 51-135412 |
| Mar. 25, 1977 | [JP] | Japan | 52-32073 |

[51] Int. Cl.² .......................... C08K 3/36; C08K 3/26; C08K 3/22
[52] U.S. Cl. .......................... 260/37 SB; 260/45.7 R; 260/45.75 P; 260/45.75 R; 260/45.75 F
[58] Field of Search ......... 260/37 SB, 46.56, 45.75 R, 260/45.75 F, 45.75 P, 45.7 R; 428/900

[56] References Cited

U.S. PATENT DOCUMENTS

| 3,087,832 | 4/1963 | Fogle | 428/900 |
| 3,514,424 | 5/1970 | Noble et al. | 260/37 SB |
| 3,711,520 | 1/1973 | Pfeifer et al. | 260/37 SB |
| 3,821,140 | 6/1974 | Milkert | 260/37 SB |
| 3,836,489 | 9/1974 | Bargain | 260/37 SB |
| 3,862,082 | 1/1975 | Hatanaka et al. | 260/37 SB |
| 3,936,476 | 2/1976 | Itoh et al. | 260/37 SB |
| 3,983,082 | 9/1976 | Pratt et al. | 260/37 SB |
| 4,002,804 | 1/1977 | Akashi et al. | 428/900 |
| 4,025,485 | 5/1977 | Kodama et al. | 260/37 SB |

OTHER PUBLICATIONS

Japanese Patent Laid Open Specification No. 50-97644–Publishing Date Aug. 2, 1975.

*Primary Examiner*—V. P. Hoke
*Attorney, Agent, or Firm*—Haseltine, Lake & Waters

[57] ABSTRACT

A self-extinguishing silicon rubber composition comprising 100 parts by weight of an organopolysiloxane having the average unit of the formula $R_aSiO_{4-a/2}$ (wherein R is a univalent hydrocarbon radical, and a is between 1.98 and 2.05), 10 to 150 parts by weight of finely powdered silica, $10^{-4}$ to $10^{-2}$ parts by weight of platinum or an amount of compound containing the same amount of platinum and 0.5 to 30 parts by weight of finely powdered $\gamma$-$Fe_2O_3$, and a self-extinguishing silicone rubber composition comprising 0.5 to 20 parts by weight of titanium dioxide and/or 0.5 to 30 parts by weight of finely powdered metal carbonate (other than alkali metal carbonates) in addition to the above-mentioned composition.

16 Claims, No Drawings

SELF-EXTINGUISHING SILICONE RUBBER COMPOSITIONS

BACKGROUND OF THE INVENTION

The present invention relates to improved self-extinguishing silicone rubber compositions.

While silicone elastomers have many excellent properties, they have the disadvantage of being flammable, and consequently many different methods have been proposed for making the materials self-extinguishing. For example, a typical one of these methods is disclosed in U.S. Pat. No. 3,514,424 in which a platinum-containing material is added to a silicone rubber compound. However, since the self-extinguishing properties caused by the addition of a platinum-containing material are not satisfactory, a large amount of research has been carried out with the intention of improving the self-extinguishing properties by using another compound in combination with the platinum-containing material. Various compounds which are to be added, in combination with platinum-containing materials, to silicone rubber compounds, have been proposed. For example, U.S. Pat. No. 3,652,488 discloses carbon black essentially free of sulfur, U.S. Pat. No. 3,635,874 discloses fumed titanium dioxide, U.S. Pat. No. 3,936,476 discloses finely powdered manganese carbonate, and Japanese Laid-Open Patent Publication No. 50-97644 discloses $(FeO)_x (Fe_2O_3)_y$ (where the ratio between $x$ and $y$ is in the range 0.05 to 1.0).

However, these proposed compounds have been unable to provide satisfactory self-extinguishing properties. The silicone rubber compound including the platinum-containing material and carbon black essentially free of sulfur is disadvantageous in that when an organic peroxide containing an acyl group is used as a vulcanizing agent, incomplete vulcanization is caused, thus deteriorating the electric properties of the resulting product. In the case of the silicone elastomer produced by adding both a platinum compound and fumed titanium dioxide, the electric properties will be deteriorated by humidity. In the case of the silicone rubber composition containing a platinum compound and manganese carbonate, incomplete vulcanization will be caused if an organic peroxide containing an acyl group is used as a vulcanizing agent. The product obtained by adding a platinum compound and $(FeO)_x(Fe_2O_3)_y$ is disadvantageous in that if the amount of $(FeO)_x(Fe_2O_3)_y$ is not large, the resulting self-extinguishing properties will be unsatisfactory, whereas if the amount of $(FeO)_x(Fe_2O_3)_y$ is increased, the mechanical properties of the resulting product silicone elastomer will be deteriorated.

SUMMARY OF THE INVENTION

It is the object of the present invention to provide self-extinguishing silicone rubber compositions which are free from the deficiencies in the prior art and capable of producing molded articles having excellent mechanical strength and heat resisting properties.

The self-extinguishing silicone rubber composition according to the invention essentially comprises the following:

(a) 100 parts by weight of organopolysiloxane having the average unit of the formula $R_aSiO_{4-a/2}$ (where R is a substituted or unsubstituted univalent hydrocarbon radical, and $a = 1.98 \sim 2.05$), (b) 10 to 150 parts by weight of finely powdered silica, (c) $10^{-4}$ to $10^{-2}$ parts by weight of platinum or an amount of a compound containing the same amount of platinum;

(d) 0.5 to 30 parts by weight of finely powdered $\gamma$-type iron sesquioxide.

Also other compositions comprising the following in addition to the above-mentioned composition come within the scope of the present invention:

($e_1$) 0.5 to 20 parts by weight of finely powdered titanium dioxide, and/or ($e_2$) 0.5 to 30 parts by weight of finely powdered metal carbonate other than alkali metal carbonates. With these compositions, the upper limit of the finely powdered $\gamma$-type iron sesquioxide content must be set to 20 parts by weight.

DETAILED DESCRIPTION OF THE INVENTION

In the compositons of this invention, the component (a) or organopolysiloxane is of the type having the unit formula $R_aSiO_{4-a/2}$ where R is a substituted or unsubstituted univalent hydrocarbon radical selected from the group consisting of methyl, ethyl, propyl and phenyl groups and their halogen substituted groups, and vinyl and allyl groups, and $a$ is between 1.98 and 2.05. The component principally consists of straight-chain diorganopolysiloxane. Specific examples of unit constituting diorganopolysiloxane include dimethylsiloxane, methylphenyl siloxane, diphenylsiloxane, methylvinyl siloxane, phenylvinyl siloxane, etc. Depending on the applications, diorganosiloxane in fluid form as well as in raw rubbery form may be used, and consequently it is a homopolymer or copolymer having a polymerization degree of 20 to 20,000 or a mixture of such polymers. These structures may also contain some units of $RSiO_{1.5}$. The group attached to the end of a chain of a molecule may include hydroxyl, alkoxy, trimethylsilyl, dimethylvinylsilyl, methyl-diphenylsilyl, methyl-phenyl-vinylsilyl and other groups, although not limited to these groups.

Any of the materials conventionally used as fillers for silicone elastomers may be used as the component (b) of finely powdered silica included in the composition of this invention. Fumed silica, precipitated silica, finely powdered quartz, diatomaceous earth, etc., may be cited as examples. In the case of non-reinforcing silica such as finely powdered quartz and diatomaceous earth, a particle size of less than 50 microns is preferred, while fine powder having a specific surface area of 100 m²/g or over is preferred in the case of reinforcing silica such as fumed silica and precipitated silica, and either of the fine powdered silica which are not subjected to preliminary surface treatment and those preliminarily surface treated with such organosilicon compounds as organosilane, organosiloxane, organosilazane, etc., may be used. Since any excessively large or small content of the component (b) results in deterioration of the mechanical properties of the resulting vulcanized silicone elastomer, the content must be in the range between 10 and 150 parts by weight to 100 parts by weight of the component (a).

As regards the component (c) or platinum or platinum-containing compound included in the compositions of the invention, the platinum content must be in the range between $10^{-4}$ and $10^{-2}$ part by weight, preferably in the range between $10^{-3}$ and $7 \times 10^{-3}$ part by weight to 100 parts by weight of the component (a). This platinum or platinum-containing compound is an essential component for imparting the self-extinguishing properties to silicone elastomers. Finely powdered platinum or finely powdered platinum carried on a carrier such as alumina, silica gel or asbestos may be cited as examples of the platinum, and chloroplatinic acid and complexes of chloroplatinic acid with alcohol, ether, aldehyde, vinylsiloxane, etc., may be cited as examples of the platinum compound. To uniformly disperse such platinum or platinum compound in the silicone rubber composition is important in imparting the desired self-extinguishing properties to the silicone elastomer, and therefore it is desirable to use the material by dissolving or dispersing it in an organic solvent such as isopropyl alcohol, ethanol, benzene, toluene or xylene or organopolysiloxane oil.

The component (d) or finely divided γ-type iron sesquioxide included in the compositions of this invention is one expressed by the chemical formula $\gamma\text{-}Fe_2O_3$, and this is an essential component, along with the component (c), in imparting the desired self-extinguishing properties to the compositions of the invention. Iron oxides may be roughly divided into iron monoxide (FeO), iron sesquioxide ($Fe_2O_3$) and triiron tetroxide (FeO $Fe_2O_3$), and there are two types of iron sesquioxide, i.e., α-type and γ-type. α-type iron sesquioxide has the face centered rhombohedral lattice and the lattice structure of α-alumina type, and it is known that the material is usually simply referred to as iron oxide or red oxide and is added to color or to improve heat resisting properties of silicone rubbers. On the other hand, γ-type iron sesquioxide has the isometric lattice and the spinel structure as well as ferromagnetic properties, and thus the material is mainly used as magnetic material for magnetic heads and as magnetic recording magnetic powder for magnetic tapes and the like. The inventor has discovered that of these iron oxides, $\gamma\text{-}Fe_2O_3$ is very effective in providing the desired self-extinguishing properties when it is added, with platinum or platinum-containing compound, to silicone rubber compositions.

The γ-type iron sesquioxide added to the composition should preferably be in the form of fine powder having a particle size of less than 50 microns, and its content should be between 0.5 and 30 parts by weight, preferably between 1 and 20 parts by weight to 100 parts by weight of the component (a). If the content is less than 0.5 part by weight, a silicone rubber composition having the desired self-extinguishing properties cannot be obtained, and if the content is greater than 30 parts by weight, the processing characteristics of the composition as well as physical properties of the resulting vulcanized silicone elastomer will be deteriorated. Where titanium dioxide as well as metal carbonate are added to the composition, the content must be less than 20 parts by weight.

The component ($e_1$) or finely powdered titanium dioxide added to the compositions of this invention is an important component which imparts, in synergistic action with the above-mentioned components (c) and (d) as well as below-mentioned metal carbonate, the desired self-extinguishing properties to the resulting silicone elastomers. While the powdered titanium dioxide conventionally used as pigment as well as heat resistant agent may be used as the finely powdered titanium dioxide included in the composition of this invention, it is particularly preferable to use fumed titanium dioxide produced industrially by subjecting titanium tetrachloride to fuming hydrolysis and having an average particle size of less than 0.1 micron. This finely powdered titanium dioxide may be treated with organosilane, organosiloxane, organosilazane or organic compounds. The content of finely powdered titanium dioxide must be in the range between 0.5 and 20 parts by weight to 100 parts of the component (a), since a content of less than 0.5 part is not sufficient for providing the desired self-extinguishing properties, while a content greater than 20 parts by weight tends to deteriorate the processing characteristics of the resulting silicone rubber compositions as well as the physical properties of the vulcanized silicone elastomers, and thus the material should preferably be added in an amount between 1 and 10 parts by weight.

The carbonates of practically all the metals excluding the alkali metals may be used for the component ($e_2$) or finely powdered metal carbonate added to the compositions of this invention. Alkali metal carbonates cannot be used, since they are strong bases, thus deteriorating the activity of platinum compounds, impeding the vulcanization by organic peroxides and causing deterioration of the products. Any other metal carbonate may also be used provided that when the silicone elastomer is burned, the metal carbonate is decomposed to discharge carbon dioxide gas and decrease the burning temperature of the elastomer and moreover the flame-out action of the carbon dioxide gas provides the desired self-extinguishing effects. As a result, the metal carbonates which have heretofore been considered as ineffective in imparting the desired self-extinguishing properties to silicone elastomers can be used to provide the effective self-extinguishing properties, and although it is not clear why these metal carbonates are effective in providing the self-extinguishing properties, it is an obvious fact that the use of the component systems (c) and (d) accomplished the end of providing the effective self-extinguishing properties.

As examples of the metal carbonate used in the present invention, normal carbonates (including their hydrates) such as cobalt carbonate, cerium carbonate, calcium carbonate, manganese carbonate, magnesium carbonate, zinc carbonate, chromium carbonate, cadmium carbonate, silver carbonate, strontium carbonate, iron carbonate, copper carbonate, lead carbonate and nickel carbonate as well as basic metal carbonates such as $4MgCO_3.Mg(OH)_2.4H_2O$, $2PbCO_3.Pg(OH)_2$, $2ZnCO_3.3Zn(OH)_2 H_2O$, $2CoCO_3.3Co(OH)_2.H_2O$, $2NiCO_3.3Ni(OH)_2.4H_2O$ and the like. The metal carbonate added should preferably be in the form of fine powder having an average particle size of less than 50 microns, and its content must be in the range between 0.5 and 30 parts by weight to 100 parts of the component (a). If the content is less than 0.5 parts, practically no self-extinguishing properties will be provided, and if the content is greater than 30 parts by weight, the mechanical properties and the electric characteristics of the resulting silicone elastomer will be deteriorated.

Prior to the heat curing of the self-extinguishing silicone rubber composition according to the invention, a known curing agent such as an organic peroxide, organohydrogen polysiloxane or the like is added and uniformly mixed with the composition. Benzoyl peroxide, 2,4-dichlorobenzoyl peroxide, 2,5-bis(t-butyl peroxy)-2,5-dimethylhexane, dicumyl peroxide, monochlorobenzoyl peroxide, t-butyl perbenzoate and the like may be cited as examples of the organic peroxide, and methyl hydrogen polysiloxane having at least two Si—H bonds in each molecule may be cited as an example of the organohydrogen polysiloxane. Where organohydrogen polysiloxane is used as the curing agent, it is essential that the component (a) always contain Si—CH=CH$_2$ groups, and the organohydrogen polysiloxane is added in such an amount that there exists 0.6 to 2.0 moles of Si-H group per mole of the Si—CH=CH$_2$ group. Where an organic peroxide is used, it must be added in an amount ranging from 0.3 to 6 parts by weight to 100 parts by weight of the component (a).

The self-extinguishing silicone rubber compositions of this invention may contain, if occasions demand, a low molecular weight organic silicone compound, as for example, hydroxy-terminated dimethylsiloxane, diphenylsilanediol or alkoxysilane. In addition, one or more kinds of finely powdered copper, calcium zirconate, zirconium silicate, organic cobalt salt, organic phosphorus compounds, azo and triazo compounds and carbon blacks essentially free of sulfur may be added. It is also possible to add such conventionally used materials as a filler, pigment, heat resistant agent such as cerium oxide or cerium hydroxide, anti-oxidizing agent, etc.

By uniformly mixing these compounding ingredients by roll kneader or kneader mixes, heating at 100° to 450° C for several seconds to one hour with or without the application of pressure, and then, if necessary, subjecting to secondary heating at 200° to 250° C for 1 to 48 hours, it is possible to produce silicone rubber products having excellent self-extinguishing properties.

DESCRIPTION OF THE PREFERRED EMBODIMENTS

The present invention will now be described in greater detail with reference to the following examples in which the parts represent parts by weight.

The self-extinguishing properties were measured in accordance as the UL 94 V test method on test pieces prepared from the heat cured silicone rubbers by cutting, each of which being 130 mm long, 13 mm wide and 2 mm thick. The first test was carried out by vertically fixedly mounting each test piece in position under windless conditions so that the lower end of the test piece slightly touched the upper portion of the inner flame of a Bunsen burner flame (11 mm in flame diameter, 20 mm in inner flame height and 40 mm in outer flame height), setting fire to the test piece by causing it to contact in this position with the flame for 15 seconds, then removing the Bunsen burner away from the test piece and measuring the time (in seconds) required for the test piece to self-extinguish. As soon as each test piece extinguished, the second test was carried out by firing again in the same manner as mentioned previously and then removing the Bunsen burner away from the test piece thus measuring the time (in seconds) required for the test piece to self-extinguish. This flame test was carried out for every five test pieces of each product and the average value (seconds) of each of five test results in the first and second test was used as the data indicative of the self-extinguishing properties.

EXAMPLE 1

A base compound was prepared by uniformly kneading and heat treating at 150° C for 2 hours 100 parts of an organopolysiloxane raw rubber (polymerization degree of 5000) comprising 99.5 mole % of dimethylsiloxane units and 0.5 mole % of methylvinyl siloxane units, 6 parts of hydroxyl-terminated dimethylpolysiloxane (having a viscosity of 40 CS at 25° C), 3 parts of diphenylsilanediol and 50 parts of fumed silica (Aerosil 200, trade name of the Japan Aerosil) having a specific surface area of 200 m$^2$/g.

Molding compositions were prepared by adding to the thusly prepared base compound 0.5 part of a 1% solution of chloroplatinic acid in isopropyl alcohol and 0.75 part of 2,4-dichlorobenzoyl peroxide as well as $\gamma$-Fe$_2$O$_3$, fumed titanium oxide and the first class reagent, finely powdered metal carbonate in the amounts shown in Tables 1 to 4 and then uniformly mixing the materials by two rolls.

The resulting compositions were subjected to vulcanization at 120° C for 10 minutes under the pressure of 30 Kg/cm$^2$ and formed into sheets of 2 mm thick and then the self-extinguishing property tests were performed under the previously mentioned conditions. The test results are shown, along those of a comparative example 1, in Tables 1 to 4.

COMPARATIVE EXAMPLE 1

As comparative example molding compositions, compositions containing no $\gamma$-Fe$_2$O$_3$ and those containing FeO.Fe$_2$O$_3$, $\alpha$-Fe$_2$O$_3$ and carbon black essentially free of sulfur were prepared under the same conditions as the example 1, and the self-extinguishing property tests were performed in the same manner. The results are shown, with those of the example 1, in Tables 1 to 4. The test numbers of the comparative example are in the 100's.

Table 1

(the example compositions containing only finely powdered silica, platinum compound and $\gamma$-Fe$_2$O$_3$ and the corresponding comparative example compositions)

| Type | | Example | | | Comparative example | | | | |
|---|---|---|---|---|---|---|---|---|---|
| Test No. | | 1 | 2 | 3 | 101 | 102 | 103 | 104 | 105 |
| Content (parts) | $\gamma$-Fe$_2$O$_3$ | 2 | 5 | 10 | — | — | — | — | — |
| | $\alpha$-Fe$_2$O$_3$ | — | — | — | 5 | 10 | — | — | — |
| | FeO · Fe$_2$O$_3$ | — | — | — | — | — | 5 | 10 | — |
| Self-extinguishing properties | 1st | 15 | 8 | 6 | 25 | 22 | 22 | 16 | 74 |
| | 2nd | 40 | 25 | 20 | 79 | 59 | 49 | 47 | burned out |

As will be seen from Table 1, the addition of $\gamma$-Fe$_2$O$_3$ resulted in the remarkably improved self-extinguishing properties. As compared with $\alpha$-Fe$_2$O$_3$ and FeO.Fe$_2$O$_3$, the addition of the same amount of $\gamma$-Fe$_2$O$_3$ was more effective in improving the self-extinguishing properties, and the same self-extinguishing properties can be obtained with the addition of it in a much lower amount.

Table 2

(the example compositions containing fumed $TiO_2$ in addition to finely powdered silica, platinum compound and $\gamma$-$Fe_2O_3$ and the corresponding comparative example compositions)

| Type | | Example | | | Comparative example | | | |
|---|---|---|---|---|---|---|---|---|
| Test No. | | 4 | 5 | 6 | 106 | 107 | 108 | 109 |
| Content (parts) | $\gamma$-$Fe_2O_3$ | 2 | 2.5 | 5 | — | — | — | — |
| | fumed $TiO_2$ | 5 | 5 | 5 | 5 | 5 | 5 | 5 |
| | $\alpha$-$Fe_2O_3$ | — | — | — | — | 5 | — | — |
| | $FeO \cdot Fe_2O_3$ | — | — | — | — | — | — | — |
| | carbon black | — | — | — | — | — | 0.125 | — |
| Self-extinguishing properties | 1st | 10 | 6 | 5 | 17 | 9 | 15 | 19 |
| | 2nd | 30 | 20 | 21 | Burned out | 37 | 29 | 48 |

As will be seen from Table 2, the compositions containing finely powdered silica, platinum compound, $\gamma$—$Fe_2O_3$ and fumed $TiO_2$ exhibited self-extinguishing properties much superior to those of the compositions containing no $\gamma$—$Fe_2O_3$ or containing $\alpha$—$Fe_2O_3$, $FeO \cdot Fe_2O_3$ or carbon black in place of $\gamma$—$Fe_2O_3$.

Table 3

(the example compositions containing metal carbonates in addition to finely powdered silica, platinum compound and $\gamma$-$Fe_2O_3$ and those further containing fumed $TiO_2$)

| Type | | Example | | | | | | | | | | | | |
|---|---|---|---|---|---|---|---|---|---|---|---|---|---|---|
| Test No. | | 7 | 8 | 9 | 10 | 11 | 12 | 13 | 14 | 15 | 16 | 17 | 18 | 19 |
| Content (parts) | $\gamma$-$Fe_2O_3$ | 2 | 2 | 2 | 2 | 2 | 2 | 2 | 2 | 2 | 2 | 2 | 2 | 2 |
| | metal carbonate | 10 | 10 | 10 | 10 | 10 | 10 | 10 | 10 | 10 | 10 | 10 | 10 | 10 |
| | (kind of metal) | (Co) | (Ce) | (Mg) | (Zn) | (Ca) | (Cr) | (Mn) | (Pb) | (Co) | (Ce) | (Mg) | (Zn) | (Cr) |
| | fumed $TiO_2$ | — | — | — | — | — | — | — | — | 5 | 5 | 5 | 5 | 5 |
| Self extinguishing properties | 1st | 10 | 5 | 5 | 4 | 8 | 10 | 7 | 4 | 6 | 4 | 3 | 4 | 4 |
| | 2nd | 23 | 11 | 17 | 13 | 21 | 18 | 20 | 11 | 15 | 9 | 5 | 8 | 8 |

As will be seen from Table 3, the addition of metal carbonate in combination with $\gamma$—$Fe_2O_3$ resulted in improved self-extinguishing properties, and the further addition of fumed $TiO_2$ had the effect of further improving the self-extinguishing properties remarkably.

Table 4

(the example compositions containing finely powdered silica, platinum compound, $\gamma$-$Fe_2O_3$, fumed $TiO_2$ and first class reagent $MnCO_3$ and the corresponding comparative example compositions)

| Type | | Example | | | | | | Comparative example | | | |
|---|---|---|---|---|---|---|---|---|---|---|---|
| Test No. | | 20 | 21 | 22 | 23 | 24 | 25 | 110 | 111 | 112 | 113 |
| Content (parts) | $\gamma$-$Fe_2O_3$ | 2 | 5 | 10 | 2 | 2 | 5 | — | — | — | — |
| | fumed $TiO_2$ | 5 | 5 | 5 | 5 | 5 | 5 | 5 | 5 | 5 | 5 |
| | $MnCO_3$ | 5 | 5 | 5 | 2.5 | 10 | 10 | 10 | 10 | 10 | 10 |
| | $\alpha$-$Fe_2O_3$ | — | — | — | — | — | — | 5 | — | — | — |
| | $FeO \cdot Fe_2O_3$ | — | — | — | — | — | — | — | 5 | — | — |
| | carbon black | — | — | — | — | — | — | — | — | 0.125 | — |
| Self-extinguishing properties | 1st | 3 | 1 | 0 | 6 | 1 | 0 | 13 | 8 | 10 | 6 |
| | 2nd | 11 | 5 | 0 | 23 | 4 | 0 | 39 | 25 | 15 | 25 |

As will be seen from Table 4, the compositions containing finely powdered silica, platinum compound, $\gamma$—$Fe_2O_3$, fumed $TiO_2$, and the first class reagent $MnCO_3$ exhibited excellent self-extinguishing properties. On the other hand, the composition contained $\alpha$—$Fe_2O_3$, $FeO \cdot Fe_2O_3$ or carbon black in place of $\gamma$—$Fe_2O_3$ showed deteriorated self-extinguishing properties.

EXAMPLE 2

A base compound was prepared by uniformly kneading and heat treating at 150° C for 2 hours 100 parts of an organopolysiloxane raw rubber (polymerization degree of 5000) comprising 99.84 mole % of dimethylsiloxane units and 0.16 mole % of methylvinyl siloxane units, 7 parts of hydroxyl-terminated dimethyl polysiloxane (the viscosity of 40 CS at 25° C), 3.5 parts of diphenylsilanediol, 1 part of trimethoxyvinylsilane, and 55 parts of fumed silica (Aerosil 200) having a specific surface area of 200 m²/g. Molding compounds were prepared by adding to the thusly prepared base compound 0.5 parts of a 1% solution of chloroplatinic acid in isopropylalcohol and $\gamma$—$Fe_2O_3$ with or without fumed titanium dioxide and first class reagent, finely powdered metal carbonate in the amounts shown in Table 5 to 7 and then further adding 0.75 parts of 2.4-dichlorobenzoyl peroxide and uniformly mixing the materials by two rolls.

The resulting compositions were vulcanized and formed under the same conditions as the Example 1 and then were subjected to the self-extinguishing property tests. The results obtained are shown in Tables 5 to 7.

COMPARATIVE EXAMPLE 2

As comparative example molding compositions, compositions containing no $\gamma$—$Fe_2O_3$ and those containing, in place of $\gamma$—$Fe_2O_3$, $FeO.Fe_2O_3$, $\alpha$—$Fe_2O_3$, etc., were prepared under the same conditions as the Example 1 and were subjected to the self-extinguishing property tests. The results obtained are shown in Table 5 to 7.

Table 5

(the example compositions containing only finely powdered silica, platinum compound and $\gamma$-$Fe_2O_3$ and the corresponding comparative examples)

| Type | | Example | | | Comparative example | | | | | | | | |
|---|---|---|---|---|---|---|---|---|---|---|---|---|---|
| Test No. | | 26 | 27 | 28 | 114 | 115 | 116 | 117 | 118 | 119 | 120 | 121 | 122 | 123 |
| Content (parts) | $\gamma$-$Fe_2O_3$ | 2.5 | 5 | 10 | — | — | — | — | — | — | — | — | — | — |
| | $\alpha$-$Fe_2O_3$ | — | — | — | 2.5 | 5 | 10 | 15 | — | — | — | — | — | — |
| | $FeO.Fe_2O_3$ | — | — | — | — | — | — | — | 2.5 | 5 | 10 | 20 | — | — |
| | Carbon black | — | — | — | — | — | — | — | — | — | — | — | 0.125 | — |
| Self-extinguishing properties (1st test) | | 28 | 25 | 18 | 48 | 47 | 41 | 30 | 33 | 29 | 27 | 25 | 35 | burned out |

As will be seen from Table 5, the addition of $\gamma$—$Fe_2O_3$ resulted in remarkably improved self-extinguishing properties. As compared with $\alpha$—$Fe_2O_3$ and $FeO.Fe_2O_3$, the addition of the same amount of $\gamma$—$Fe_2O_3$ was much more effective in improving the self-extinguishing properties, and similar self-extinguishing properties can be ensured by the addition of $\gamma$—$Fe_2O_3$ in a much lower amount as compared with the former. As compared with the carbon black, the $\gamma$—$Fe_2O_2$ was also effective in improving the self-extinguishing properties.

Table 6

(the example compositions containing fumed $TiO_2$ in addition to finely powdered silica, platinum compound and $\gamma$-$Fe_2O_3$ and the corresponding comparative example compositions)

| Type | | Example | | Comparative example | | | |
|---|---|---|---|---|---|---|---|
| Test No. | | 29 | 30 | 124 | 125 | 126 | 127 |
| Content (parts) | $\gamma$-$Fe_2O_3$ | 2.5 | 5 | — | — | — | — |
| | $\alpha$-$Fe_2O_3$ | — | — | 5 | — | — | — |
| | $FeO.Fe_2O_3$ | — | — | — | 5 | — | — |
| | Carbon black | — | — | — | — | 0.125 | — |
| | fumed $TiO_2$ | 5 | 5 | 5 | 5 | 5 | 5 |
| Self-extinguishing properties (1st) | | 24 | 19 | 36 | 27 | 31 | 43 |

As will be seen from Table 6, the addition of $\gamma$—$Fe_2O_3$ together with the fumed $TiO_2$ resulted in improved self-extinguishing properties as compared with those obtained by adding these components singly. Also, when used in combination with the fumed $TiO_2$, the addition of $\gamma$—$Fe_2O_3$ was more effective in improving the self-extinguishing properties than $\alpha$—$Fe_2O_3$, $FeO.Fe_2O_3$ and the carbon black.

Table 7

(the example compositions containing finely powdered silica, platinum compound, $\gamma$-$Fe_2O_3$, fumed $TiO_2$ and first class reagent $MnCO_3$ and the corresponding comparative compositions)

| Type | | Example | | | | | | Comparative example | | |
|---|---|---|---|---|---|---|---|---|---|---|
| Test No. | | 31 | 32 | 33 | 34 | 35 | 36 | 128 | 129 | 130 |
| Content (parts) | $\gamma$-$Fe_2O_3$ | 2 | 5 | 10 | 10 | 2 | 5 | — | — | — |
| | $\alpha$-$Fe_2O_3$ | — | — | — | — | — | — | 5 | — | — |
| | $FeO.Fe_2O_3$ | — | — | — | — | — | — | — | 5 | — |
| | carbon black | — | — | — | 0.125 | — | — | — | — | 0.125 |
| | fumed $TiO_2$ | 5 | 5 | 5 | 5 | 5 | 5 | 5 | 5 | 5 |
| | $MnCO_3$ | 5 | 5 | 5 | 5 | 10 | 10 | 10 | 10 | 10 |
| Self-extinguishing properties (1st test) | | 18 | 11 | 5 | 4 | 10 | 6 | 21 | 17 | 17 |

As will be seen from Table 7, the addition of the fumed $TiO_2$ and $MnCO_3$ with $\gamma$—$Fe_2O_3$ resulted in improved self-extinguishing properties. It will also be seen that despite the addition of the fumed $TiO_2$ and $MnCO_3$, the addition of $\alpha$—$Fe_2O_3$, $FeO.Fe_2O_3$ or the carbon black in place of $\gamma$—$Fe_2O_3$ had the effect of deteriorating the self-extinguishing properties.

EXAMPLE 3

100 parts of dimethyl vinylsilyl-terminated dimethyl polysiloxane having a viscosity of 2000 CS at 25° C, 2 parts of trimethylsilyl-terminated methylhydrogen polysiloxane having a viscosity of 10 CS at 25° C, 20 parts of fumed silica (specific surface area of 200 m²/g) having been made hydrophobic by surface treatment with trimethylsilyl groups, 5 parts of $\gamma$—$Fe_2O_3$ and the finely powdered metal carbonate shown in Table 8, were mixed uniformly. After 0.75 part of a 1% solution of chloroplatinic acid in isopropyl alcohol had been added to the resulting mixture, the mixture was sufficiently blended, poured into a stainless steel frame of 2 mm in depth, cured by heating for 30 minutes at 150° C and formed into sheet products of 2 mm in thickness. These products were subjected to the self-extinguishing property test under the previously mentioned conditions, and the results obtained are shown in Table 8.

COMPARATIVE EXAMPLE 3

As comparative example molding compositions, compositions containing no $\gamma$—$Fe_2O_3$ and metal carbonate were prepared under the same conditions as the Example 3 and were subjected to the self-extinguishing property tests. The results obtained are shown in Table 8.

Table 8

| Type | | Example | | | | | | Comparative example |
|---|---|---|---|---|---|---|---|---|
| Test No. | | 29 | 30 | 31 | 32 | 33 | 34 | 124 |
| Content (parts) | $\gamma$-$Fe_2O_3$ | 5 | 5 | 5 | 5 | 5 | 5 | — |
| | metal carbonate (type) | $Ce_2(CO3)_3$ | $ZnCO_3$ | $MgCO_3$ | $MnCO_3$ | $2PbCO_3$ $Pb(OH)_2$ | — | — |
| Self-extinguishing properties | 1st | 7 | 6 | .8 | 7 | 6 | 18 | completely burned out |
| | 2nd | 19 | 16 | 15 | 20 | 15 | 45 | — |

What I claim is:

1. A self-extinguishing silicone rubber composition comprising:
   (a) 100 parts by weight of an organopolysiloxane having the average unit of the formula $R_aSiO_{4-a/2}$ (wherein R is a substituted or unsubstituted univalent hydrocarbon radical, and $a = 1.98 \sim 2.05$);
   (b) 10 to 150 parts by weight of finely powdered silica;
   (c) $10^{-4}$ to $10^{-2}$ part by weight of platinum or an amount of a platinum compound containing the same amount of platinum, and
   (d) 0.5 to 30 parts by weight of finely powdered $\gamma$-type iron sesquioxide.

2. A composition according to claim 1, wherein the univalent hydrocarbon radical in said organopolysiloxane is a methyl or vinyl group.

3. A composition according to claim 1, wherein said finely powdered silica is fumed silica.

4. A composition according to claim 1, wherein said platinum compound is chloroplatinic acid.

5. A self-extinguishing silicone rubber produced by subjecting to heat curing the composition set forth in claim 1.

6. A self-extinguishing silicone rubber composition comprising:
   (a) 100 parts by weight of an organopolysiloxane having the average unit of the formula $R_aSiO_{4-a/2}$ (wherein R is a substituted or unsubstituted univalent hydrocarbon radical, and $a = 1.98$ to $2.05$);
   (b) 10 to 150 parts by weight of finely powdered silica;
   (c) $10^{-4}$ to $10^{-2}$ part by weight of platinum or an amount of a platinum compound containing the same amount of platinum; and
   (d) 0.5 to 20 parts by weight of finely powdered $\gamma$-type iron sesquioxide; as well as a member selected from the group consisting of
   ($e_1$) 0.5 to 20 parts by weight of finely powdered titanium dioxide;
   ($e_2$) 0.5 to 30 parts by weight of finely powdered metal carbonate other than alkali metal carbonates and mixtures of ($e_1$) and ($e_2$).

7. A composition according to claim 6, wherein the univalent hydrocarbon radical in said organopolysiloxane is a methyl or vinyl group.

8. A composition according to claim 6, wherein said finely powdered silica is fumed silica.

9. A composition according to claim 6, wherein said platinum compound is chloroplatinic acid.

10. A composition according to claim 6, wherein said titanium dioxide is fumed titanium dioxide.

11. A composition according to claim 6, wherein said metal carbonate is at least one metal carbonate selected from the group consisting of cobalt carbonate, cerium carbonate, calcium carbonate, manganese carbonate, magnesium carbonate, zinc carbonate, chromium carbonate and lead carbonate.

12. A composition according to claim 11, wherein said metal carbonate is manganese carbonate.

13. A self-extinguishing silicone rubber produced by subjecting to heat curing the composition set forth in claim 6.

14. A composition according to claim 1, wherein the univalent hydrocarbon radical in said organopolysiloxane is a methyl or vinyl group, the finely powdered silica is fumed silica, and the platinum compound is chloroplatinic acid.

15. A composition according to claim 6, wherein the univalent hydrocarbon radical in said organopolysiloxane is a methyl or vinyl group, the finely powdered silica is fumed silica, the platinum compound is chloroplatinic acid, the titanium dioxide is fumed titanium dioxide and the metal carbonate is at least one metal carbonate selected from the group consisting of cobalt carbonate, cerium carbonate, calcium carbonate, manganese carbonate, magnesium carbonate, zinc carbonate, chromium carbonate and lead carbonate.

16. A composition according to claim 15 wherein the metal carbonate is manganese carbonate.

* * * * *